UNITED STATES PATENT OFFICE.

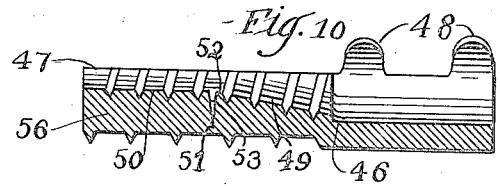
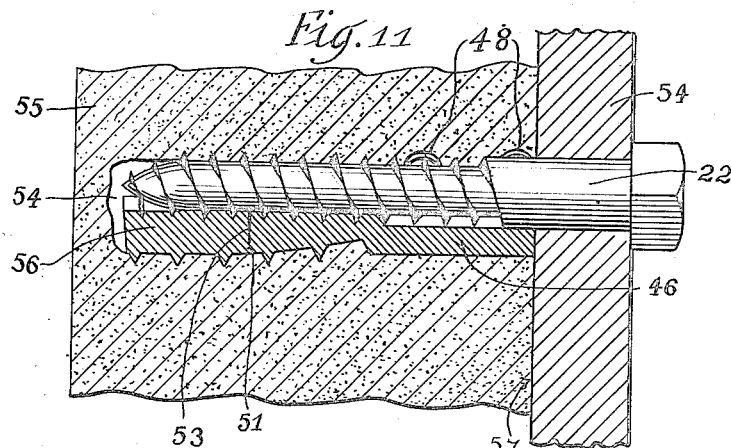
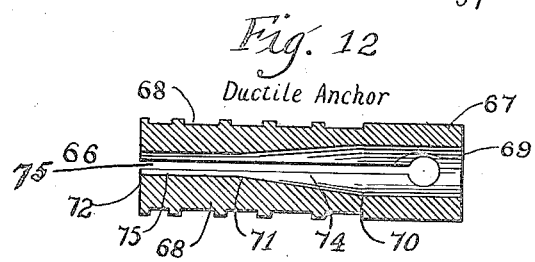
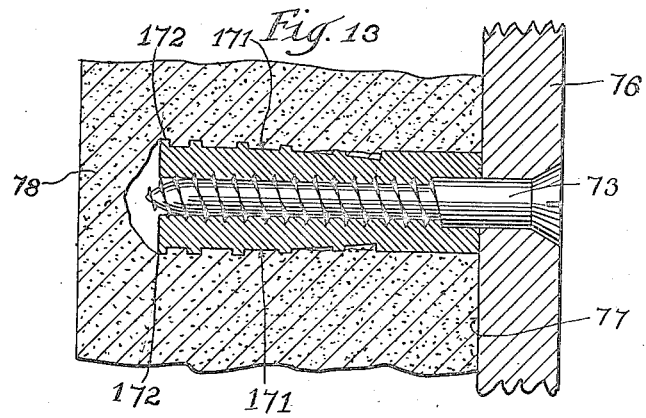

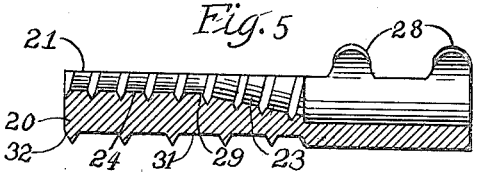
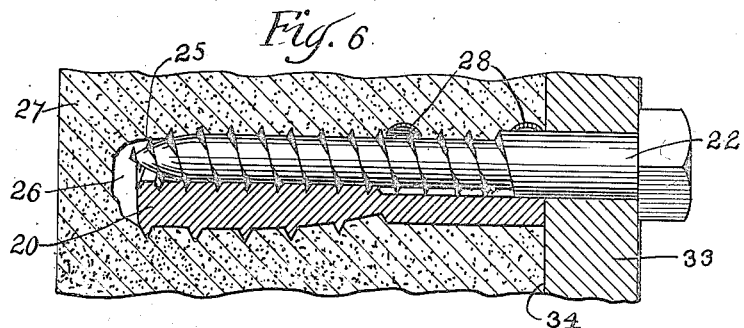
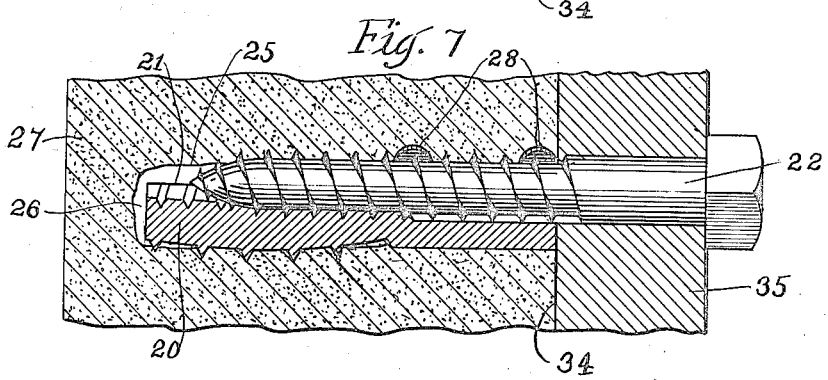
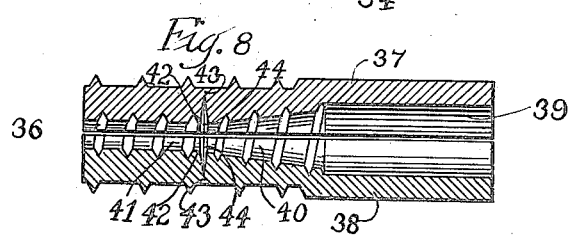
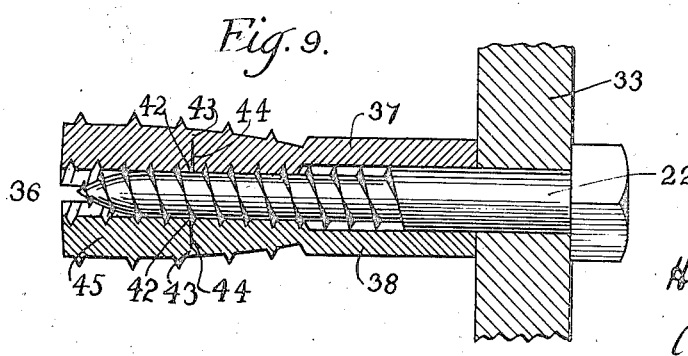

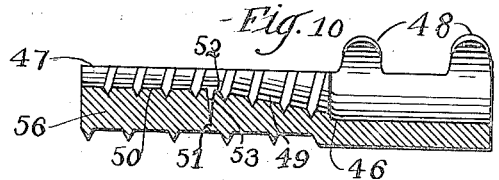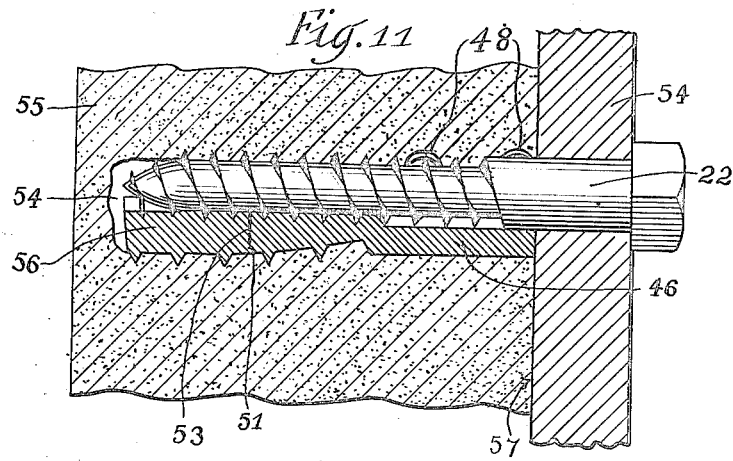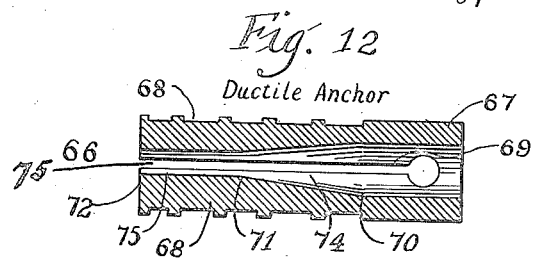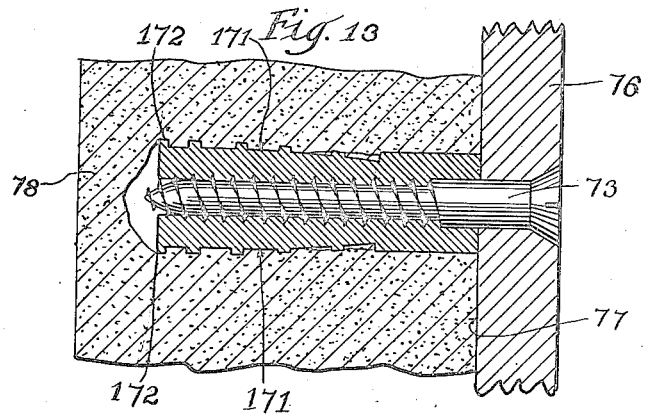

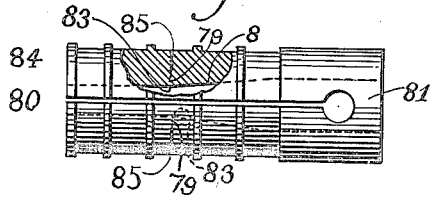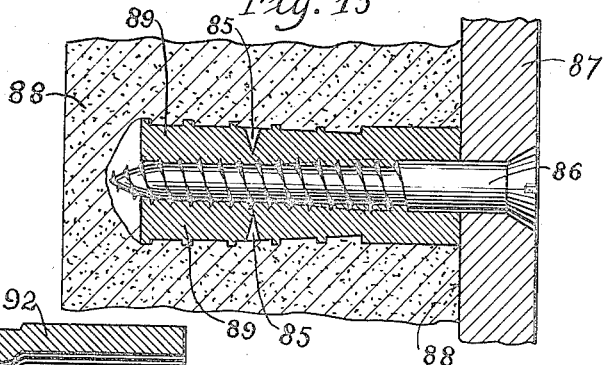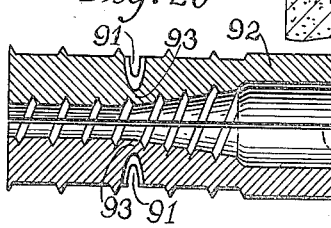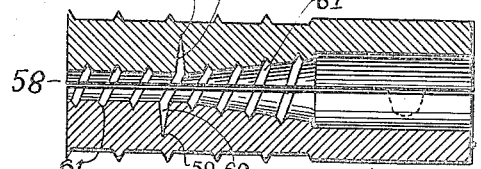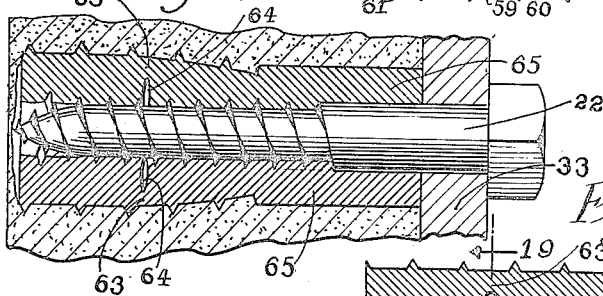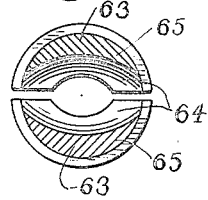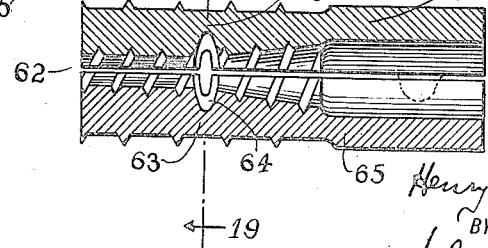

HENRY W. PLEISTER, OF WESTFIELD, NEW JERSEY, ASSIGNOR TO HENRY B. NEWHALL.

BOLT-ANCHOR.

1,248,003.　　　　　Specification of Letters Patent.　　Patented Nov. 27, 1917.

Application filed September 20, 1916. Serial No. 121,104.

*To all whom it may concern:*

Be it known that I, HENRY W. PLEISTER, a citizen of the United States, residing at Westfield, in the county of Union and State of New Jersey, have invented certain new and useful Improvements in Bolt-Anchors, of which the following is a specification, taken in connection with the accompanying drawings.

My invention relates to bolt anchors.

In the present form of bolt anchors the maximum expansion is approximately at the extreme inner end of the anchor. In practice this is often a serious detriment in that the screw or other expanding member, having forced the bolt anchor out to its maximum expansion, binds and it is impossible to bring the head of the bolt or screw up flush with the work. This requires that the hole be enlarged entailing additional labor and expense, or that a different size bolt anchor be used.

By my invention I overcome this serious objection and give a longer surface of maximum contact or grip on the exterior of the bolt anchor, thereby giving an increased frictional hold and distributing this maximum grip over a larger area than with the present forms. My invention further permits the screw or bolt to coöperate with the bolt anchor with less effort, than in the present forms.

My invention further relates to certain details of construction which will be described in the specification and pointed out in the claims.

I have shown in the accompanying drawings several illustrative embodiments of my invention but of course it is to be understood that my invention is not to be confined simply to the forms illustrated except as required by the scope of the appended claims. In these drawings the same reference numerals refer to similar parts.

Figure 1 is a side elevation, partly in vertical section, of a two-part bolt anchor embodying my invention. The form shown is what is known in the trade as a lag shield;

Fig. 2 is a vertical section through the lag shield shown in Fig. 1, the support and the work supported; the lag screw used to expand the lag shield is shown in side elevation;

Fig. 3 is a view similar to Fig. 2 showing work of a different thickness held to the support;

Fig. 4 is an end elevation of the lag shield shown in Fig. 2, the lag screw being omitted;

Fig. 5 is a vertical longitudinal section through a one-part bolt anchor known as a one-part lag shield;

Fig. 6 is a vertical section through the one-part lag shield shown in Fig. 5, the support, and the work supported, the lag screw being in side elevation.

Fig. 7 is a longitudinal vertical section showing the bolt anchor holding work of a different thickness from that shown in Fig. 6;

Fig. 8 is a vertical section through a two-part bolt anchor, known as a two-part lag shield, showing weakening portions;

Fig. 9 is a vertical section through a two-part lag shield, provided with the weakening portions of Fig. 8, shown expanded by the lag screw holding the work to the support;

Fig. 10 is a longitudinal vertical section through a one-part bolt anchor, known as a one-part lag shield, showing weakening portions;

Fig. 11 is a vertical section through the one-part lag shield shown in Fig. 10, the support, and the work supported, and showing the coöperating lag screw in side elevation;

Fig. 12 is a vertical section of a bolt anchor, known as a ductile anchor, or anchor or screw anchor, which is formed of material sufficiently ductile to permit the screw to cut its own coöperating female screw threads in the anchor;

Fig. 13 is a vertical section of the anchor of Fig. 12, expanded in the support; the wood screw coöperating with the ductile anchor is shown in side elevation;

Fig. 14 is a side elevation of a ductile anchor provided with weakening portions;

Fig. 15 is a vertical section of the ductile anchor of Fig. 14, expanded and coöperating with the wood screw, the support and work supported being shown in section;

Fig. 16 is a vertical section of a two-part lag shield, showing a modified form of weakening portions formed by deepening one of the female screw threads;

Fig. 17 is a vertical section of a two-part lag shield showing a modified manner of forming weakening portions by running a hole or aperture through both parts of the lag shield;

Fig. 18 is a vertical section showing the lag shield of Fig. 17 in its expanded condition;

Fig. 19 is a transverse vertical section substantially on the line 19—19 of Fig. 17;

Fig. 20 is a detail fragmentary view showing a lag shield with the weakening valley on the outside.

In the illustrative embodiments of my invention, 1, Fig. 1, is a lag shield formed of the two members 2 and 3 and provided with the clamping lugs 4 as in the common practice.

In the form of lag shield now on the market the bore has an inclined substantially uniform taper extending from near one end to the other end of the shield. In coöperating with a lag screw, such as 5, the maximum expansion in the old form is approximately at points equivalent to 11, 11 that is, at the end of the old lag shields. In my invention I form the lag shield with an axial bore 14 having an inclined portion 7 which reaches its nearest approach to the axis at the points 8, 8, some distance from the end 9 of the lag shield. From the points 8, 8 I form my bore with a substantially cylindrical surface 10, 10, the surface being substantially co-axial to the longitudinal axis of the bolt anchor. By my invention the maximum grip, instead of being confined at the end of the bolt anchor, is distributed along the surface of the bolt anchor from points 11, 11 to the points 6, 6, which distance may of course, be varied. This gives a long surface of contact and increased frictional hold, and distributes the maximum grip over a larger area.

The practical application of this form of my invention is shown in Figs. 2 and 3. In these figures the support 12 is provided with the hole 13 within which is mounted the lag shield 1. The lag screw 5 is then screwed into the axial bore 14 and first engages with the tapered inclined surface 7, 7 and expands the lag shield until it firmly and positively grips the interior surface of the hole 13. As soon as the end of the lag screw 5 passes the points 8, 8 it begins to travel down that portion of the axial bore 14 having substantially cylindrical sides 10, 10. In making this travel the grip, due to the maximum expansion is distributed over comparatively a large area of the wall 13 lying between the points 6 and 11 rather than being solely at the surface of the hole in contact with the ends 11, 11. In Fig. 1 the dotted lines indicate substantially the position taken by the interior and exterior of the shield when expanded. The straight dotted lines on the interior show that upon being expanded the inner bore becomes substantially cylindrical to coöperate with the lag shield. The outer surface is substantially as shown by the dotted lines, which, however, are somewhat exaggerated.

In Fig. 2 I have shown the lag screw 5 holding the work 15 flush to the surface 16 of the support 12, by bringing the head 17 of the lag screw up against the work. With the work of the thickness shown in Fig. 2, the end of the lag screw about emerges from the inner end of the lag shield.

The same size lag shield and lag screw will hold work of a different thickness 18 after having reached its maximum expansion without extending throughout the parallel portion, Fig. 3. In this case the end of the lag screw 5 will not quite emerge at the end of the lag shield. In all cases, however, the head of the lag screw can be instantly brought up flush against the work, whatever its thickness may be, without the screw jamming in the lag shield in a position where its head 17 cannot be brought up snugly against the work. This is due to the fact that the point of maximum expansion is extended over a relatively large portion of the surface of the lag shield so that the end of the screw can be brought anywhere along the parallel portion of the interior bore 14, or past the end of the lag shield as may be found necessary, to bring the head 17 flush against the work and at the same time obtain the requisite maximum expansion of the lag shield. In the old form, as previously noted, where the expansion is at the end of the shield, the lag screw would often jam at this point before its head was brought flush with the work 15 or 18, as the case may be, requiring the removal of the lag shield and the enlargement of the hole, or the use of a different size lag shield.

In the form of lag shield which has been described the two parts 2 and 3 are made of stiff material such for example, as malleable iron, and the screw threads 19 are cast in sand molds, at least two members being required to make a complete lag shield.

In Figs. 5, 6 and 7, I have shown my invention applied to a one-part lag shield 20 having an open side 21 permitting the lag screw 22 to engage directly with the inclined surface 23 and the parallel surface 24 of the lag shield and also directly with the wall 25 of the hole 26 in the support 27.

In this form of my invention the lag shield 20 is preferably provided with lugs 28, 28. The inclined surface 23 merges about at the point 29 with the cylindrical surface 24. The function and effect of the inclined and cylindrical screw engaging surfaces are the same as the form just described, the maximum grip being distributed over approximately the surface between the points 31 and point 32 at the very end of the anchor, which distance may be varied.

In Fig. 6 the lag bolt 22 is shown coöperating with the lag shield shown in Fig. 5, and holding the work 33 tight against the face 34 of the support 27. In Fig. 7, the same lag screw and one-part lag shield is shown holding the work 35, of a different thickness to the face 34 of the support 27.

I may in some cases to assist the ready insertion of the screw form my bolt anchor with one or more weakening portions which will permit a portion of the bolt anchor to yield or spring slightly with relation to the other part. This weakening portion is preferably located adjacent to the termination of the inclined portion of the axial bore or surface engaged by the screw or bolt.

I have shown for example in Fig. 8, a two-part lag shield 36 formed of the parts 37 and 38 and having the axial bore 39 formed of the inclined bore 40 and the substantially concentric bore 41. Adjacent to points 42, 42, where the inclined bore merges into the concentric bore, I preferably form weakening portions 43, 43. These weakening portions may be made in various ways. In Fig. 8, I form them by making deep valleys 44, 44.

In operation, as shown in Fig. 9, when the lag screw 22 moves past the point 42 the inner ends 45, 45 of the lag shield tend to bend or spring at the weakening portions 43, 43, and in that manner tend to close up the valleys 44, 44, Fig. 9.

The same idea of weakening a portion of the bolt anchor can be carried out in the one part lag shield such for example as shown in Figs. 10 and 11. In these figures the one part lag shield 46 having the open side 47, the lugs 48, 48, and the inclined surface 49, the cylindrical surface 50 has a weakening portion 51 arranged adjacent to the point 52 where the inclined surface 49 merges into the cylindrical surface 50. This weakening portion 51 can likewise be formed in various ways, as for example, by deep valleys 53.

In Fig. 11, it will be seen that when this lag shield 46 engages the hole 54 in the support 55 that the inner portion 56 will bend or spring slightly at the weakening portion 51 and tend to close up the valleys 53 as the work 54 is secured snugly against the wall 57 of the support 55.

In all these forms of my device the lag shield whether formed of one or two parts are preferably made of malleable iron and are cast, as is the common practice, in sand molds from proper patterns. My invention also permits the lag screw or bolt to travel through the shield with less effort than in the case of a continuously inclined inner surface along which the screw or bolt has to travel.

Instead of forming my weakening portions by means of a valley such as 44 and 53, I may form a weakening portion, of course, in various other ways, as for example, by having a lag shield 58, Fig. 16, in which the weakening portions 59, 59 are formed by deepening one thread 60 of the threads 61. Or I may, for example, have a bolt anchor 62, Fig. 17, in which the weakening portions 63, 63 are formed by making a slot or hole 64, directly through the two portions 65, 65 of the bolt anchor. I may place a valley 91 on the exterior of a lag shield 92, such as is shown in Fig. 20, forming a weakening portion 93.

While I have described my invention as applied to bolt anchors made of relatively hard material, such as lag shields preferably made of malleable iron, it is also adapted for bolt anchors made of ductile material in which the screw threads of the expanding screw cuts its own coöperating female screw thread in the bolt anchor. These ductile bolt anchors are known in the trade as anchors or screw anchors. I have shown such anchors in Figs. 12 to 15 of my drawings. In the anchor 66, Fig. 12, the collar 67 is provided with two integral tines 68, 68 and with an axial bore 69, which I have shown tapered from 70 to 71. At the point 71 I have shown the tapered bore merging into a bore 75 which is concentric to the longitudinal axis of the anchor and of the same diameter as the maximum taper of the tapered bore. This concentric bore extends to the end 72 of the anchor.

The action of the wood screw 73, Fig. 13, moving down the inclined bore 74 getting the maximum expansion distributed over a large surface extending from 171 to 172 is just the same as described for the bolt anchors made of relatively hard material. The wood screw 73, Fig. 13, cuts its own coöperating screw threads in the axial bore 69, and in the inclined axial bore 74 and also in the concentric bore 75 and in this manner holds the work 76 to the face 77 of the support 78.

I may also provide my ductile anchors with a weakening portion such as 79, 79, Fig. 14 which preferably are placed on the exterior. In this form the ductile anchor 80 is provided with the axial bore 81 having the inclined portion 82 reaching its nearest approach to the axis at substantially the points 83, 83, and then extending from these points 83, 83 to the end 84 with a substantially concentric bore. The weakening portions 79, 79 I have formed, in the example shown, by locating deep valleys 85, preferably on the exterior, adjacent to the points 83, 83.

In operation the wood screw 86 holds the work 87 to the support 88 by cutting and forming a screw thread along the axial bore 81 of the anchor 80, and in doing so springs or moves the ends 89, 89 with relation to the other portion of the anchor 80, and in this manner opening, or tending to open, the valleys 85, 85.

In the different figures of the drawings, for purpose of illustration, I have somewhat exaggerated the preferred angle of the inclined portion of the axial bore.

That part of my invention covering a weakening portion is covered in my copending divisional aplication for "bolt anchors", filed January 20, 1917, Ser. No. 143,426.

Having thus described this invention in connection with several illustrative embodiments thereof, to the details of which I do not desire to be limited, what is claimed as new and what is desired to secure by Letters Patent is set forth in the appended claims.

1. In a bolt anchor an expansible member having an internal expanding surface inclined to the longitudinal axis of said member, and a substantially cylindrical expanding surface joining said inclined surface at its nearest approach to said axis, and a rotative expanding member adapted to engage with the said inclined and cylindrical surfaces and having a diameter greater than the distance of said inclined surface from said axis at a point a substantial distance from its junction with said cylindrical surface.

2. In a bolt anchor an expansible member having an internal expanding surface inclined to the longitudinal axis of said member, and a substantially cylindrical expanding surface joining said inclined surface at its nearest approach to said axis.

3. In a bolt anchor an expansible member having an internal screw-threaded expanding surface inclined to the longitudinal axis of said member, and a substantially cylindrical screw-threaded expanding surface joining said inclined screw-threaded surface at its nearest approach to said axis.

4. In a bolt anchor expansible members adapted to be forced apart and having internal expanding surfaces inclined to the longitudinal axis of said members, substantially cylindrical expanding surfaces joining said inclined surfaces at their nearest approach to said axis.

5. In a bolt anchor expansible members adapted to be forced apart and having internal expanding surfaces inclined to the longitudinal axis of said members, substantially cylindrical expanding surfaces joining said inclined surfaces at their nearest approach to said axis and a rotative expanding member adapted to engage with the said inclined and cylindrical surfaces and having a diameter greater than the distance of said inclined surfaces from said axis at a point a substantial distance from their junction with said cylindrical surfaces.

6. In a bolt anchor expansible members adapted to be forced apart and having internal screw-threaded expanding surfaces inclined to the longitudinal axis of said members, substantially cylindrical screw-threaded expanding surfaces joining said inclined screw-threaded surfaces at their nearest approach to said axis and a rotative expanding member adapted to engage with the said inclined and cylindrical surfaces and having a diameter greater than the distance of said inclined surfaces from said axis at a point a substantial distance from their junction with said cylindrical surfaces.

7. In a bolt anchor expansible members adapted to be forced apart and having internal screw-threaded expanding surfaces inclined to the longitudinal axis of said members, substantially cylindrical screw-threaded expanding surfaces joining said inclined screw-threaded surfaces at their nearest approach to said axis and a screw-threaded expanding member adapted to engage with the said screw-threaded inclined and cylindrical surfaces and having a diameter greater than the distance of said screw-threaded inclined surfaces from said axis at a point a substantial distance from their junction with said cylindrical surfaces.

8. In a bolt anchor an expansible member having an internal expanding inclined screw-threaded surface and a substantially cylindrical expanding screw-threaded surface, both said screw-threaded surfaces adapted to coöperate with a screw-threaded expanding device, and a screw-threaded expanding device.

9. In a bolt anchor a plurality of expansible members forming substantially a hollow cylinder provided with a bore having a screw-threaded surface, walls of said cylinder being thinnest near the outer end of the anchor and uniformly increasing in thickness to a point between the extremities of the bolt anchor and from thence continuing with uniform thickness to the opposite end of the bolt anchor.

10. An article of manufacture comprising a lag shield formed of comparatively rigid metal having an internal screw-threaded expanding surface inclined to the longitudinal axis of said member, and a substantially cylindrical screw-threaded expanding surface joining said inclined screw-threaded surface at its nearest approach to said axis.

11. An article of manufacture comprising a lag shield provided with a coaxial cavity of variable diameters provided at its entrance with a cylindrical bore merging into an inwardly tapering screw-threaded bore for part of its distance, said inwardly tapering screw-threaded bore substantially uniformly reducing in diameter as it progresses to a point between extremities, from which point to the farther extremity the diameter remains substantially constant and in the form of a screw-threaded cylinder.

HENRY W. PLEISTER.

Witnesses:
A. M. WILLIAMS,
M. R. RYAN.